(12) United States Patent
Chih et al.

(10) Patent No.: US 10,678,370 B2
(45) Date of Patent: Jun. 9, 2020

(54) ALIGNING METHOD FOR USE IN SEMICONDUCTOR INSPECTION APPARATUS

(71) Applicant: MPI Corporation, Hsinchu County (TW)

(72) Inventors: Lin-Lin Chih, Hsinchu County (TW); Guan-Jhih Liou, Hsinchu County (TW); Chien-Hung Chen, Hsinchu County (TW); Yung-Chin Liu, Hsinchu County (TW)

(73) Assignee: MPI CORPORATION, Hsinchu County (TW)

( * ) Notice: Subject to any disclaimer, the term of this patent is extended or adjusted under 35 U.S.C. 154(b) by 0 days.

(21) Appl. No.: 16/104,309

(22) Filed: Aug. 17, 2018

(65) Prior Publication Data
US 2019/0171328 A1    Jun. 6, 2019

(30) Foreign Application Priority Data

Dec. 5, 2017  (TW) .............................. 106142623 A (51) Int. Cl.
*G06F 3/041* (2006.01)
*G06T 7/00* (2017.01)
*G06T 7/73* (2017.01)

(52) U.S. Cl.
CPC .......... *G06F 3/0416* (2013.01); *G06T 7/0004* (2013.01); *G06T 7/73* (2017.01); *G06T 2207/30148* (2013.01)

(58) Field of Classification Search
CPC combination set(s) only.
See application file for complete search history.

(56) References Cited

U.S. PATENT DOCUMENTS

2016/0210028 A1* 7/2016 Kanev ................ G01R 31/2808

FOREIGN PATENT DOCUMENTS

TW            201322752 A1    6/2013

* cited by examiner

*Primary Examiner* — Deeprose Subedi
(74) *Attorney, Agent, or Firm* — Birch, Stewart, Kolasch & Birch, LLP (57) ABSTRACT

An aligning method for use in semiconductor inspection apparatus is provided. The semiconductor inspection apparatus includes a stage and a touch-control screen. The aligning method includes defining a reference direction; displaying an image of a device under test supported by the stage on the touch-control screen; detecting a first touch point and a second touch point occurred on the touch-control screen; defining a straight line according to the first touch point and the second touch point; calculating an included angle defined by the straight and the reference direction; and rotating the stage according to the included angle.

16 Claims, 13 Drawing Sheets

ALIGNING METHOD FOR USE IN SEMICONDUCTOR INSPECTION APPARATUS

CROSS-REFERENCE TO RELATED APPLICATION

This non-provisional application claims priority under 35 U.S.C. § 119(a) to Patent Application No. 106142623 filed in Taiwan, R.O.C. on Dec. 5, 2017, the entire contents of which are hereby incorporated by reference.

BACKGROUND

Technical Field

The instant disclosure relates to an aligning method, in particular, to an aligning method for use in a semiconductor inspection apparatus.

Related Art

The dies on the wafer have several signal input/output pads. When performing the electrical test of the die, the test probe has to be aligned with the signal input/output pads and in contact with the pads. The dies on the wafer are typically arranged in a repeated pattern in horizontal and vertical direction. When placing the wafer on the chuck manually this pattern will be slightly rotated. For easy die to die navigation, the dies should be aligned along a straight horizontal line. To do so the chuck theta axis needs to be rotated. In a semiconductor inspection apparatus known to the inventor(s), the aligning procedure can be achieved by hardware operation using a control stick, pressing buttons, or by using the user operation software built in the semiconductor inspection apparatus.

SUMMARY

In view of these, one embodiment of the instant disclosure provides an aligning method for use in a semiconductor inspection apparatus. The semiconductor inspection apparatus comprises a stage and a touch-control screen. The aligning method comprises following steps: defining a reference direction; displaying an image of a device under test (DUT) supported by the stage on the touch-control screen; detecting a first touch point and a second touch point occurred on the touch-control screen, and defining a straight line according to the first touch point and the second touch point; moving both touch points until the straight line matches the rotation offset; releasing the touch points and finalizing the definition of the straight line; calculating an included angle defined by the straight line and the reference direction; and rotating the stage according to the included angle. It is understood that, the order for describing the above steps is not a limitation for limiting the executing order of the steps.

Another embodiment of the instant disclosure provides an aligning method for use in a semiconductor inspection apparatus. The semiconductor inspection apparatus comprises a stage and a touch-control screen. The aligning method comprises following steps: displaying an image of a device under test (DUT) supported by the stage on the touch-control screen; detecting a first touch point and a second touch point occurred on the touch-control screen, and defining a first straight line according to the first touch point and the second touch point; detecting a third touch point and a fourth touch point occurred on the touch-control screen, and defining a second straight line according to the third touch point and the fourth touch point; calculating an included angle defined by the first straight line and the second straight line; and rotating the stage according to the included angle.

Yet another embodiment of the instant disclosure provides an aligning method for use in a semiconductor inspection apparatus. The semiconductor inspection apparatus comprises a stage and a touch-control screen. The aligning method comprises following steps: displaying an image of a device under test (DUT) supported by the stage on the touch-control screen; detecting a first touch track occurred on the touch-control screen, and defining a first straight line according to the first touch track; detecting a second touch track occurred on the touch-control screen, and defining a second straight line according to the second touch track; calculating an included angle defined by the first straight line and the second straight line; and rotating the stage according to the included angle.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
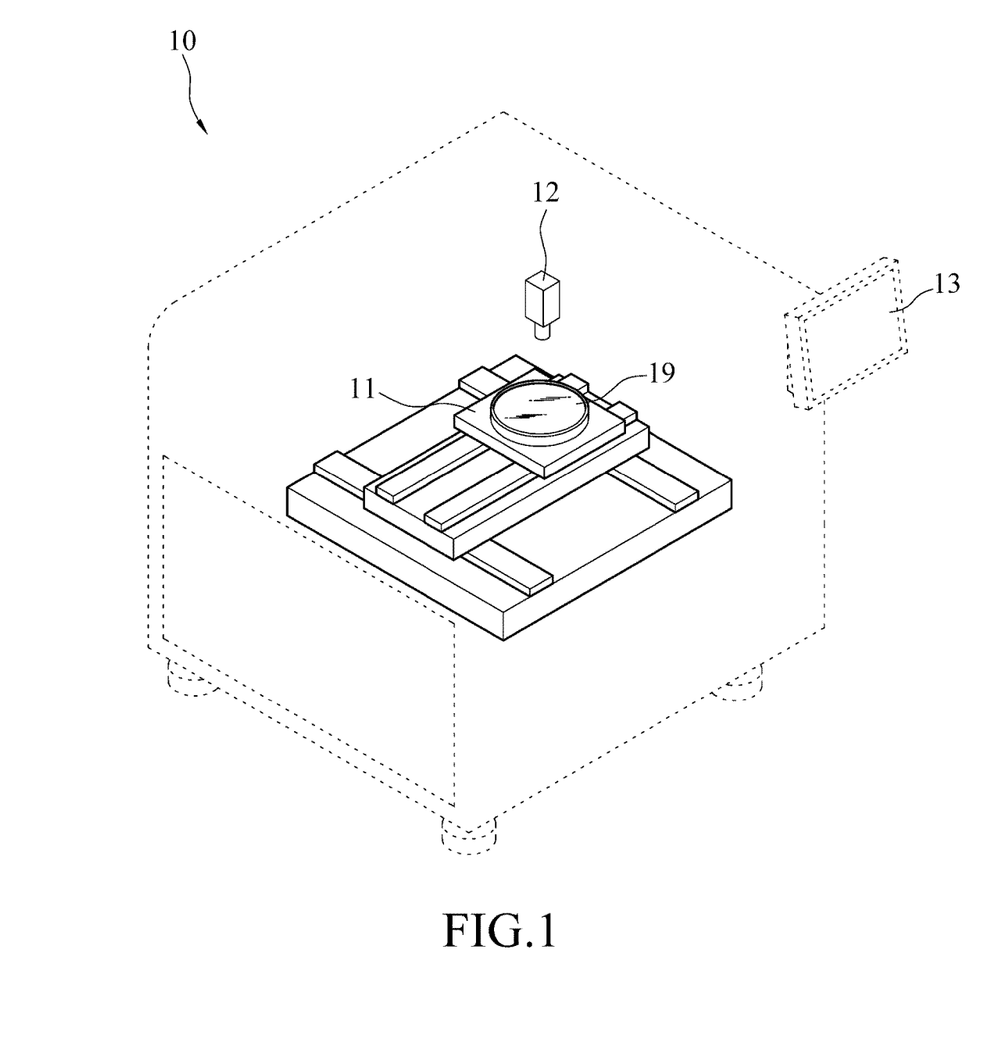
FIG. 1 illustrates a schematic view of a semiconductor inspection apparatus.
Figure 2:
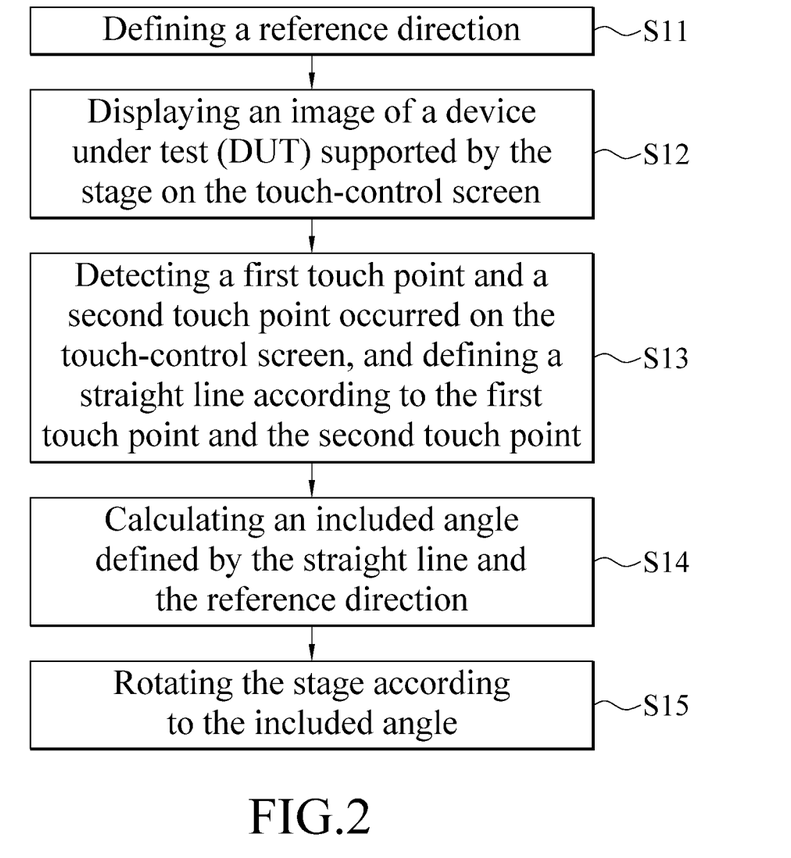
FIG. 2 illustrates a flowchart of an aligning method according to a first embodiment of the instant disclosure.

Please refer to FIGS. 1 and 2, respectively illustrate a schematic view of a semiconductor inspection apparatus and a flowchart of an aligning method according to a first embodiment of the instant disclosure. In one or more embodiments, the semiconductor inspection apparatus 10 comprises a stage 11, a camera module 12, and a touch-control screen 13. The stage 11 supports a device under test 19 (DUT 19, e.g., a wafer), and the image captured by the camera module 12 is displayed on the touch-control screen 13 instantly. The aligning method according to the first embodiment is described below with FIGS. 3 to 5.

Figure 3:
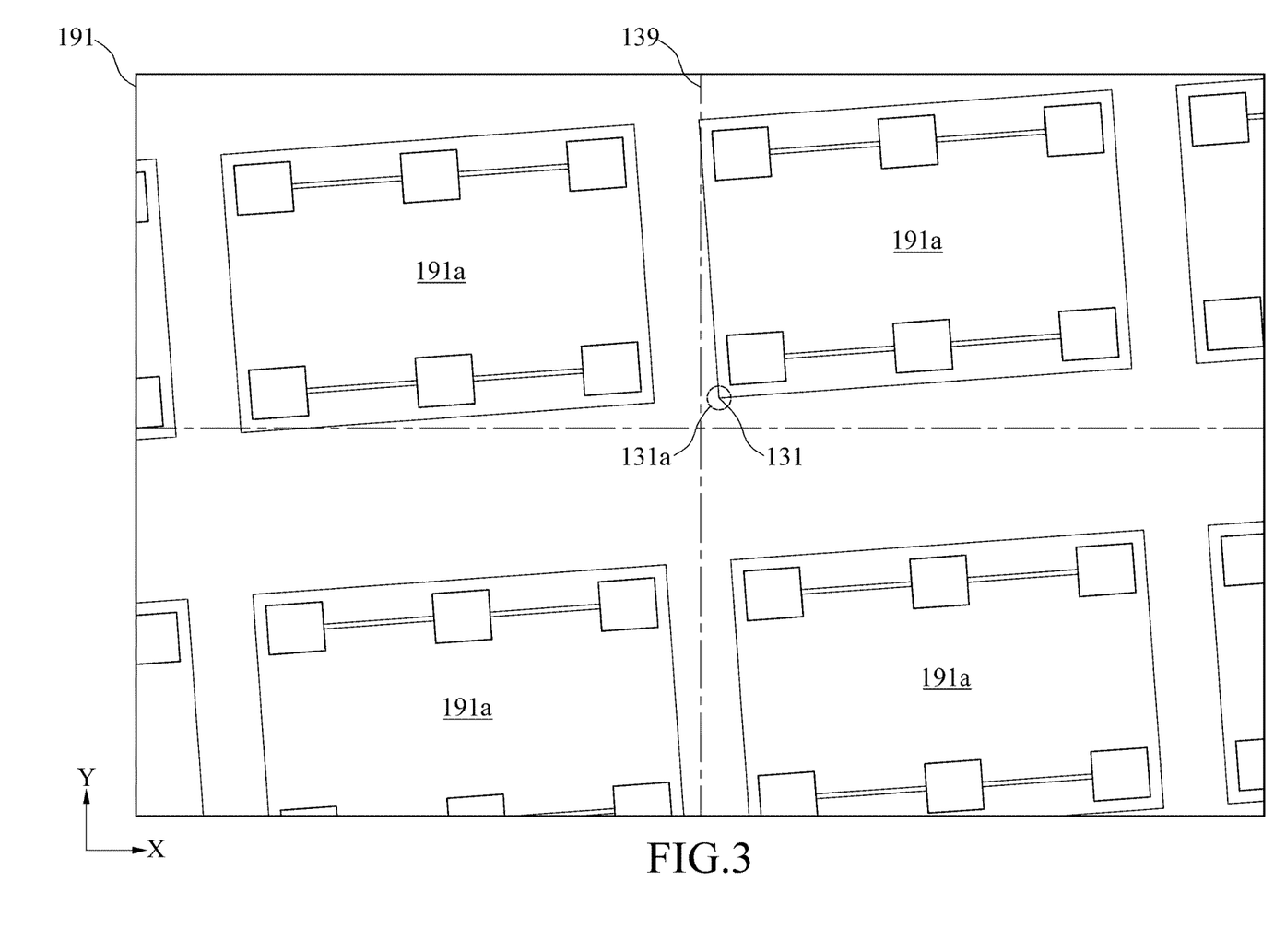
FIG. 3 illustrates a schematic view (1) of an aligning operation according to the first embodiment.

As shown in FIG. 3, the touch-control screen 13 displays the image 191 of the DUT 19, and the touch-control screen 13 further displays a cross auxiliary line 139 formed by crossed vertical and horizontal lines. Hence, an engineer can roughly determine if the image has an offset. By checking the die pattern 191a of the image 191 and the cross auxiliary line 139, the engineer can be easily aware that the image 191 of the DUT 19 has a rotational offset by an angle and needed to be calibrated. To a semiconductor inspection apparatus known to the inventor(s), when the DUT 19 has an offset, the engineer uses a solid stick, solid buttons, or operation software built in the semiconductor inspection apparatus to control the movement and the rotation of the stage 11, until the image 191 of the DUT 19 displayed on the display does not have an obvious offset. In this embodiment, a further intuitive operation is provided. First, to detect an operation that the engineer touches a first touch point 131 and a second touch point 132 on the touch-control screen 13. The operation is detected to obtain coordinates of the first touch point 131 and the second touch point 132, respectively. Then, a straight line 14 is defined according to the coordinates of the first touch point 131 and the second touch point 132. Next, a horizontal line on the touch-control screen 13 could be used to define a reference direction. For example, the direction of the positive X axis in FIG. 3 is taken as a reference direction, and an included angle $\theta_1$ defined by the straight line 14 and the direction of the positive X axis. Then, the stage 11 is rotated according to the included angle $\theta_1$ to perform a calibration of the rotational offset. Likewise, a vertical line could be used to define a reference direction. For example, the direction of the positive Y axis could be used to define a reference direction too. And the reference direction could be selected automatically depending on the included angle defined by the straight line 14 and the reference direction. It means, the direction which defines an included angle smaller than 45° with the straight line 14 will be selected as the reference direction. The first touch point 131 and the second touch point 132 may be obtained at the same time or at different times. When the first touch point 131 and the second touch point 132 are obtained at the same time, the fingertip of the engineer or a stylus pen touches the first touch point 131 and the second touch point 132 on the touch-control screen 13 at the same time. When the first touch point 131 and the second touch point 132 are obtained at different times, the fingertip of the engineer or the stylus pen first touches the first touch point 131 on the touch-control screen 13 and then touches the second touch point 132 on the touch-control screen 13.

In some embodiment, the engineer can move his fingertips or the stylus pen on the touch-control screen 13 to adjusting the straight line, and only when the engineer releases his fingertips or stylus pen from the touch-control screen 13, the straight line is then determined. It means the first touch point 131 and the second touch point 132 occurred on the touch-control screen 13 could be varying according to the moving of the engineer's fingertips or the stylus pen on the touch-control screen 13.

It is understood that, the rotation angle of the stage 11 is not necessarily equal to the included angle $\theta_1$ defined by the straight line 14 and the direction and the positive X axis, the reason is described as following. Upon the rotation of the stage 11 of the semiconductor inspection apparatus 10, the stage 11 is rotated by taking the geometrical center of the stage 11 as the rotation axis; when the DUT 19 (e.g., a wafer) is placed on the stage 11, the geometrical center of the DUT 19 is almost overlapped with the geometrical center of the stage 11. Hence, when the stage 11 is rotated, the DUT 19 is rotated relative to the geometrical center itself (e.g., the center of the wafer). However, the included angle $\theta_1$ defined by the straight line 14 and the direction of the positive X axis is not necessarily equal to the rotational offset angle between the entire DUT 19 and the geometrical center of the DUT 19 (i.e., the rotation axis). Therefore, after the included angle $\theta_1$ defined by the straight line 14 and the direction of the positive X axis is calculated, the rotational offset angle has to be calculated according to not only the included angle $\theta_1$ but also the model of the semiconductor inspection apparatus 10 as well as the positional relationship between the camera module 12 and the DUT 19, so that the rotational offset angle of the DUT 19 can be obtained, and the stage 11 is rotated by the rotational offset angle to perform the calibration.

Figure 4:
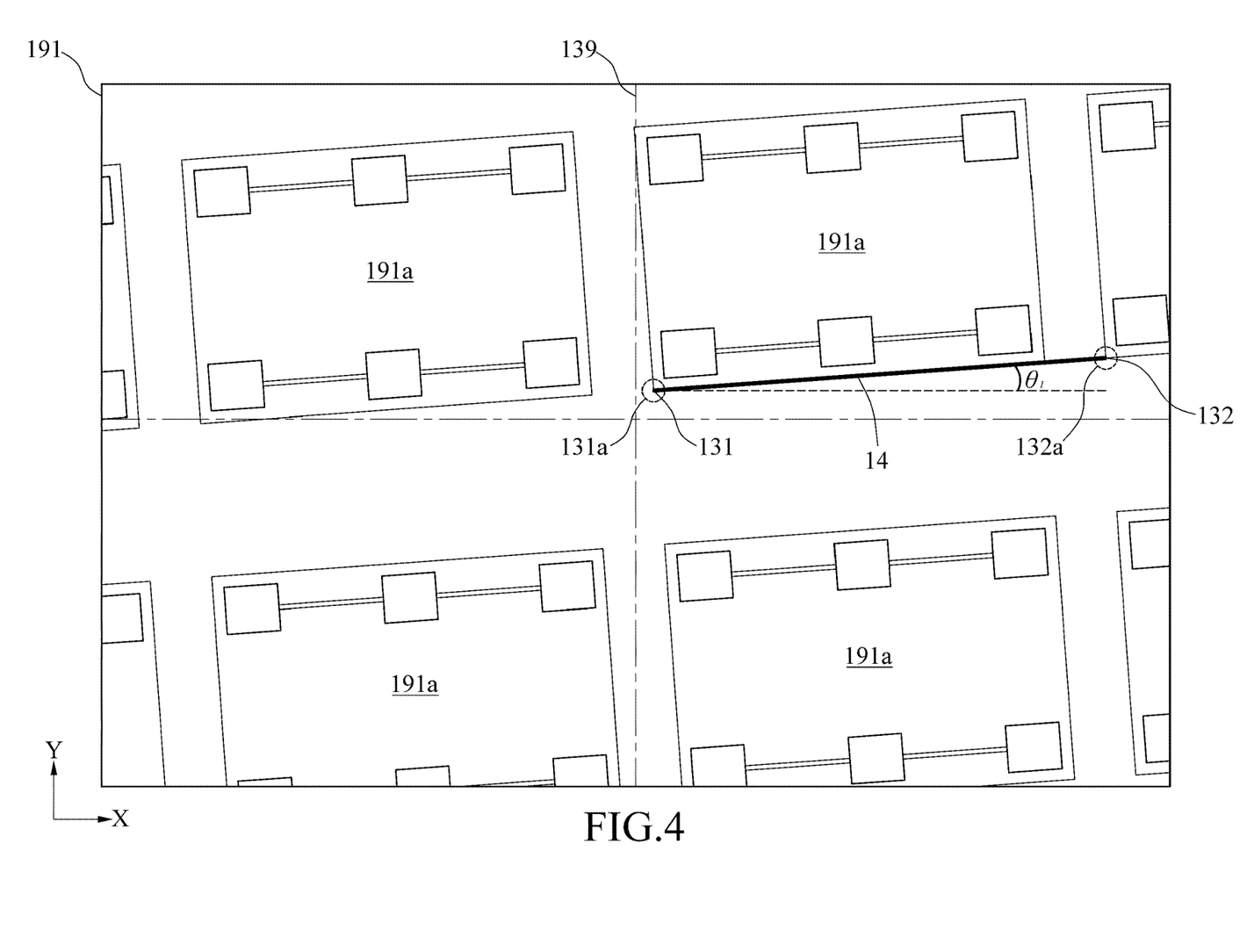
FIG. 4 illustrates a schematic view (2) of the aligning operation according to the first embodiment.

During the engineer performs the touch operation, the engineer may try to find if a longer straight line exists in the image 191. If yes, the engineer can select the two ends of the straight line as the first touch point 131 and the second touch point 132 respectively. For example, as shown in FIG. 4, the same portions of different semiconductor die patterns are tapped and selected as the first touch point 131 and the second touch point 132, respectively. If the rotational offset still exists after a first calibration procedure is performed, the aforementioned steps are repeated to control the rotation of the stage 1I, until the image 191 does not have an obvious rotational offset. In general, the longer length of the straight line 14 is, the higher the possibility of that the image 191 can be precisely calibrated by one-time calibration. Therefore, in one or more embodiments, the semiconductor inspection apparatus 10 can provide "an anchoring function". In other words, after the first touch point 131 is selected, the semiconductor inspection apparatus 10 can detect an anchoring touch operation (e.g., tapping and selecting a drop-down list or executing a press-and-hold operation). Hence, the subsequent touch operation(s) would not be taken as the operation(s) for touching the second touch point 132. At this moment, the engineer can move the stage 11 by the touch operation until the image 191 includes the die pattern at the edge of the DUT 19, and then, the engineer performs the operation for touching the second touch point 132. In consequence, the straight line 14 defined can go across a larger area of the DUT 19, and the rotational offset angle of the DUT 19 can be calculated more precisely.

Figure 5:
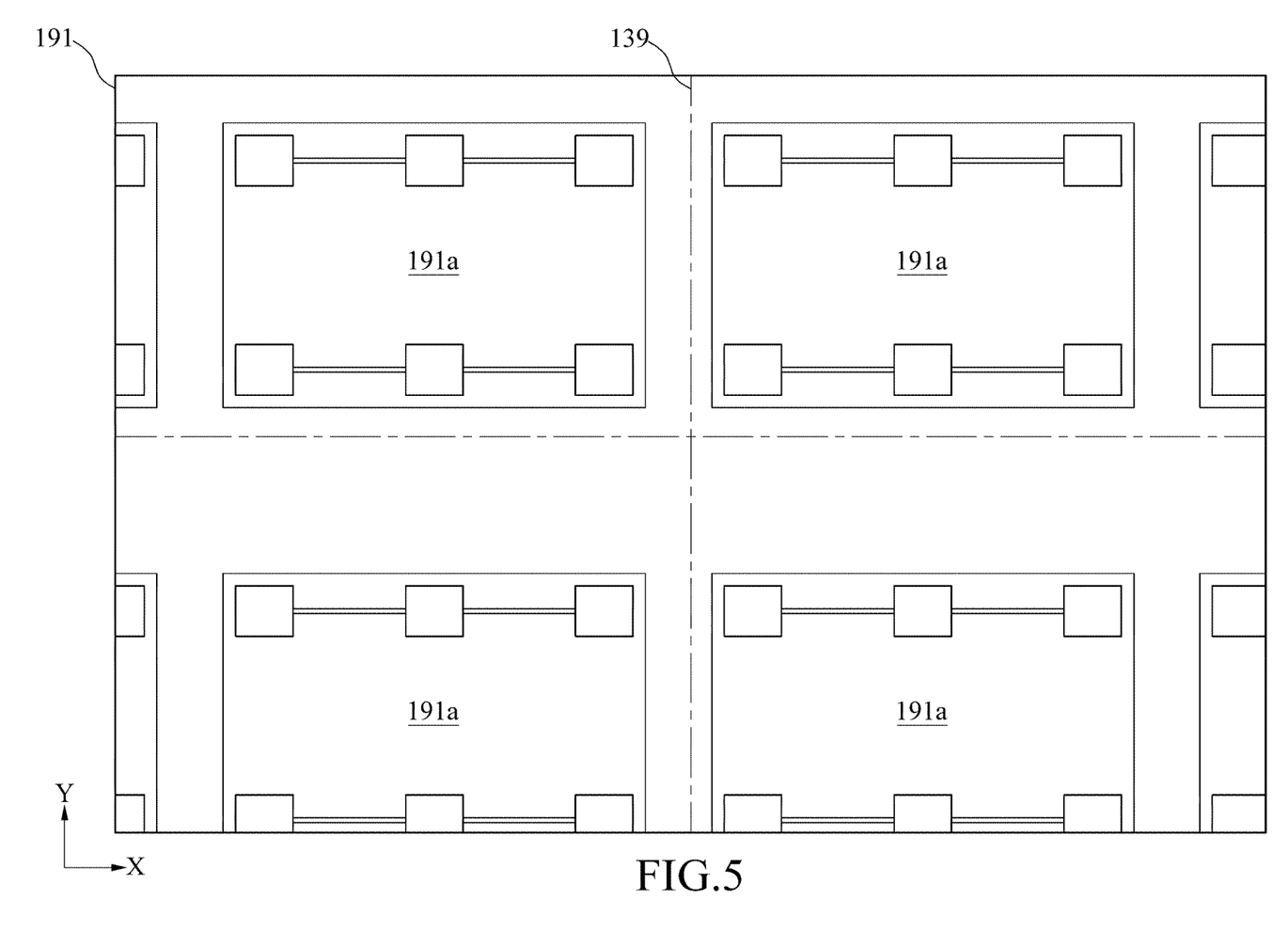
FIG. 5 illustrates a schematic view (3) of the aligning operation according to the first embodiment.
Figure 6:
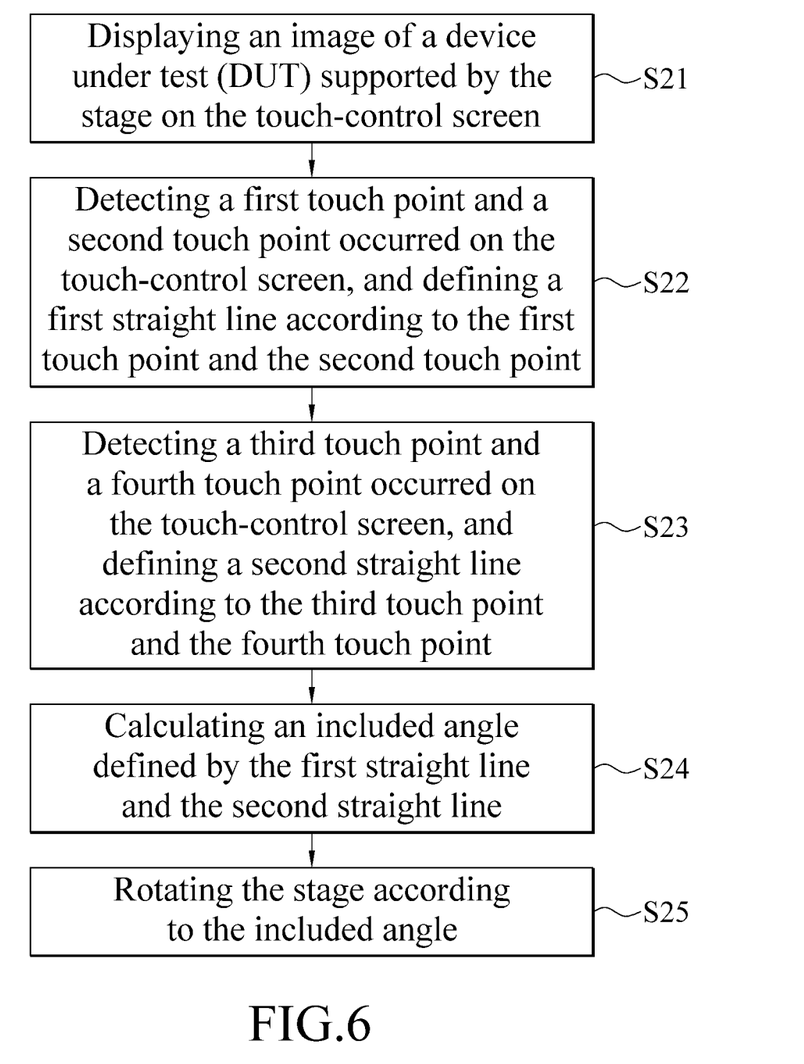
FIG. 6 illustrates a flowchart of an aligning method according to a second embodiment of the instant disclosure.

In the first embodiment, when the engineer performs the touch operation on the touch-control screen 13, the position of the touch-control screen 13 where the engineer touches displays a special mark, so the engineer can know the position of the touch-control screen 13 being touched. As shown in FIG. 3, when the engineer touches the touch-control screen 13 via the fingertip or the stylus pen to define the first touch point 131, a circle mark 131a is displayed at the position of the first touch point 131, and the circle mark 131a is still displayed on the touch-control screen 13 even when the fingertip or the stylus pen leaves the touch-control screen 13. As shown in FIG. 4, when the engineer further touches the touch-control screen 13 to define the second touch point 132, a circle mark 132a is displayed at the position of the second touch point 132, and the straight line 14 defined by the first touch point 131 and the second touch point 132 is also displayed on the touch-control screen 13. Moreover, as shown in FIG. 5, when the straight line 14 is defined, the stage 11 is rotated according to the included angle $\theta_1$ defined by the straight line 14 and the direction of the positive X axis, and the value of the included angle $\theta_1$ can be displayed on the touch-control screen 13 as a reference for the engineer. Again, it is understood that, the rotation angle of the stage 11 is not necessarily equal to the included angle $\theta_1$; in general, the rotational offset angle has to be calculated according to not only the included angle $\theta_1$ but also the model of the semiconductor inspection apparatus 10 as well as the positional relationship between the camera module 12 and the DUT 19, so that the rotational offset angle of the DUT 19 can be obtained, and the stage 11 is rotated by the rotational offset angle.

Please refer to FIGS. 6 to 9, respectively illustrate a flowchart and schematic views (1), (2), and (3) of an aligning method according to a second embodiment of the instant disclosure. In the first embodiment, the stage 11 is rotated according to the included angle $\theta_1$ defined by the straight line 14 and the reference direction (the direction of the positive X axis), while in the second embodiment, the stage 11 is rotated according to an included angle defined by two straight lines which are defined by the engineer through operating the touch-control screen 13. The aligning method of the second embodiment is described as following.

Figure 7:
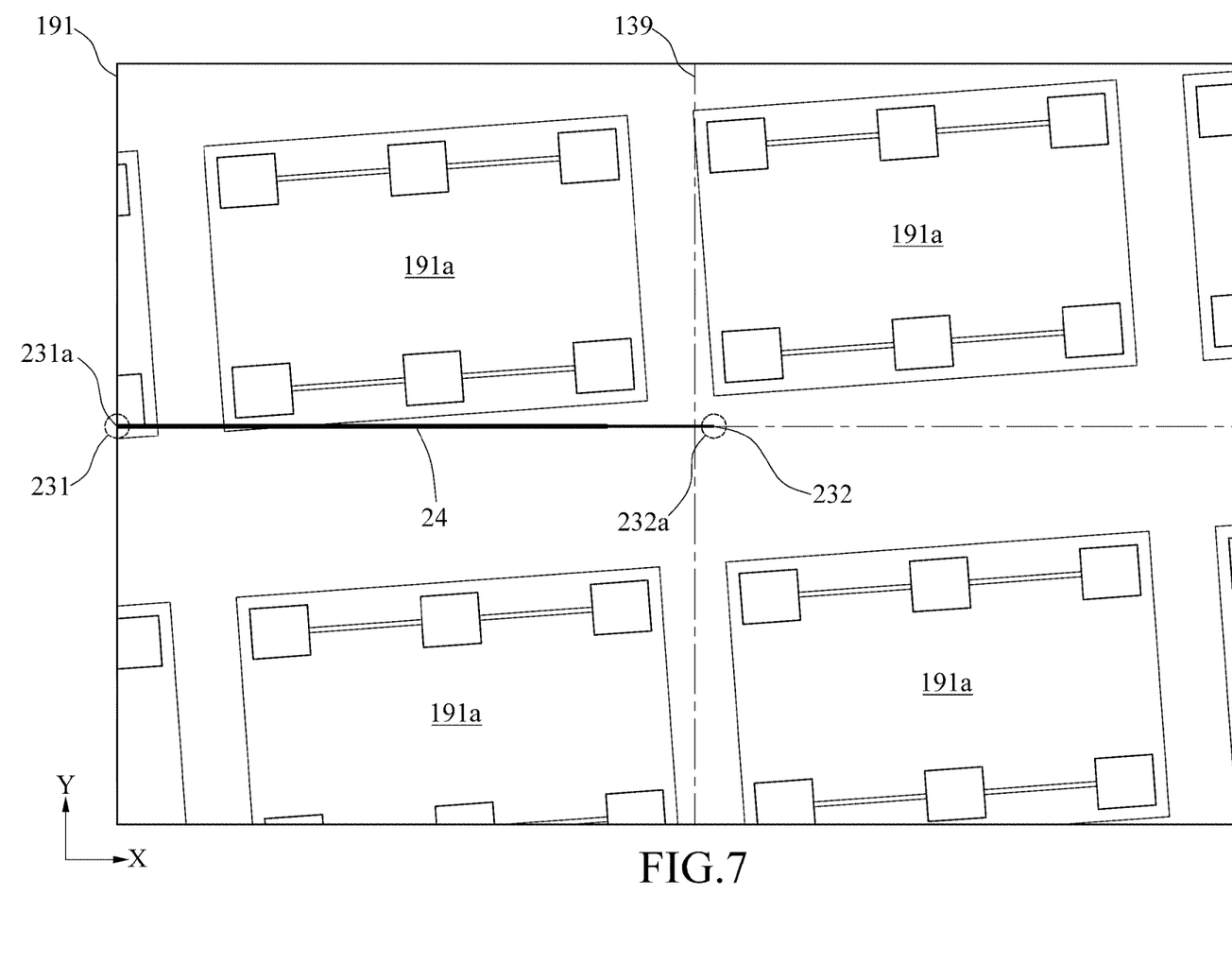
FIG. 7 illustrates a schematic view (1) of an aligning operation according to the second embodiment.
Figure 8:
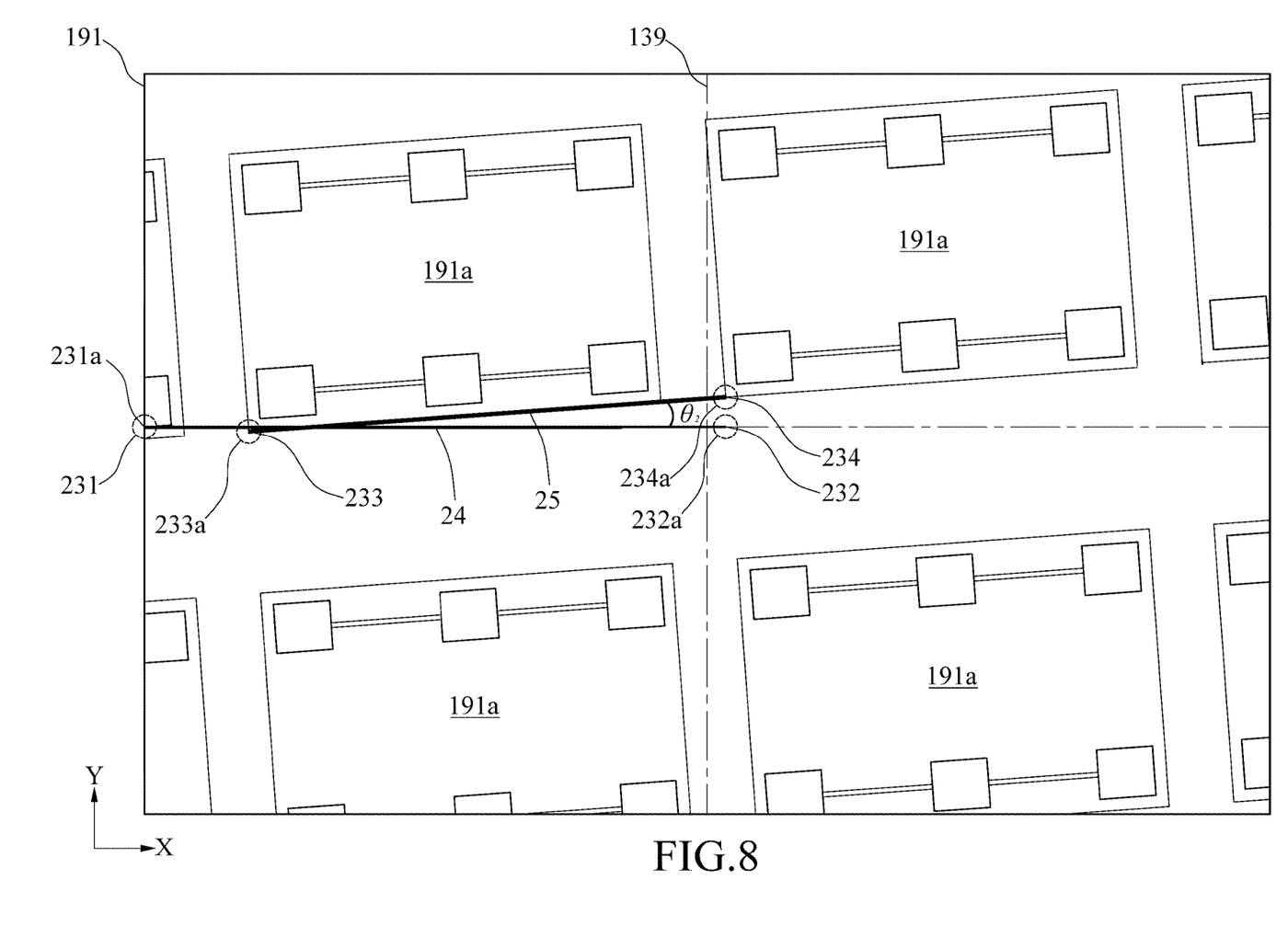
FIG. 8 illustrates a schematic view (2) of the aligning operation according to the second embodiment.
Figure 9:
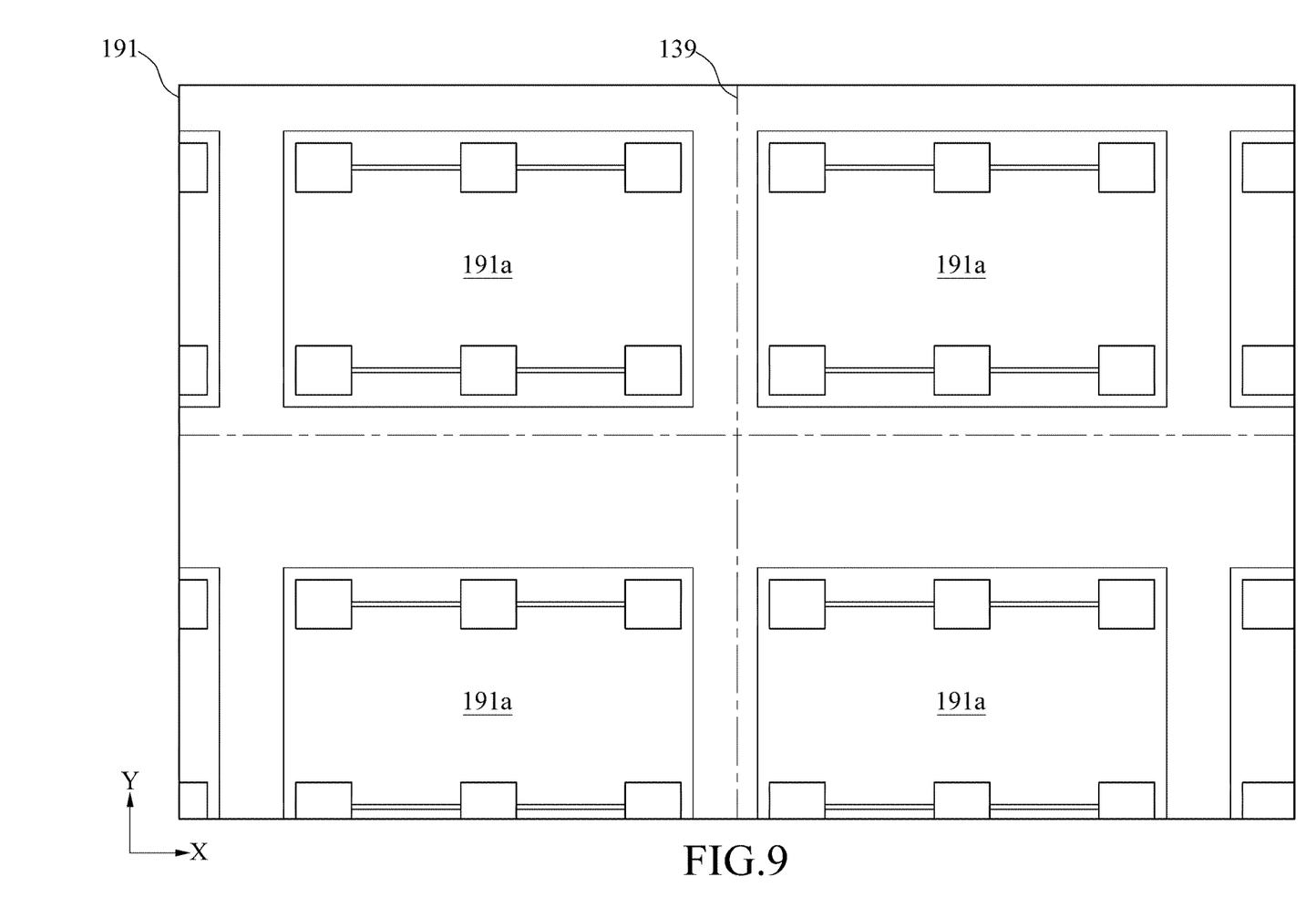
FIG. 9 illustrates a schematic view (3) of the aligning operation according to the second embodiment.
Figure 10:
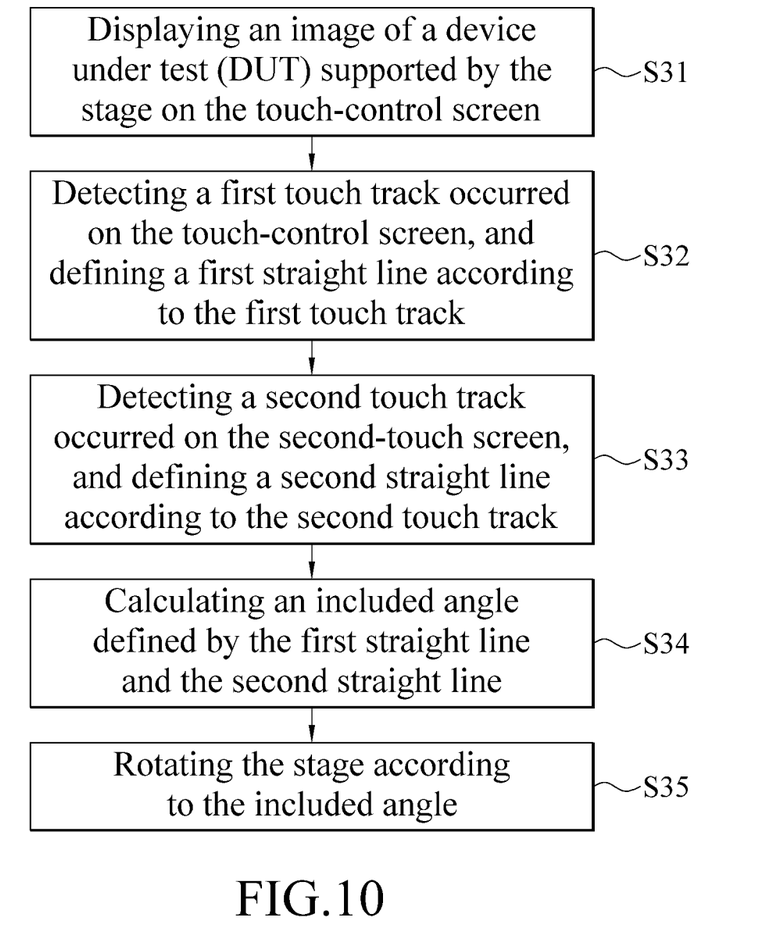
FIG. 10 illustrates a flowchart of an aligning method according to a third embodiment of the instant disclosure.

As shown in FIG. 7, the touch-control screen 13 displays the image 191 of the DUT 19 and the cross auxiliary line 139. Hence, with the cross auxiliary line 139, the engineer can roughly determine if the image 191 has an offset. By checking the die pattern 191a of the image 191 and the cross auxiliary line 139, the engineer can apparently see the image 191 of the DUT 19 has a rotational offset by an angle and needed to be calibrated. In this embodiment, first, the engineer touches a first touch point 231 and a second touch point 232 on the touch-control screen 13, and the operation is detected to obtain coordinates of the first touch point 231 and the second touch point 232, respectively. Then, a first straight line 24 defined according to the coordinates of the first touch point 231 and the second touch point 232. Next, as shown in FIG. 8, in this embodiment, the engineer touches a third touch point 233 and a fourth touch point 234 on the touch-control screen 13, and the operation detected to obtain coordinates of the third touch point 233 and the fourth touch point 234, respectively. Then, a second straight line 25 is defined according to the coordinates of the third touch point 233 and the fourth touch point 234. Last, as shown in FIG. 9, after an included angle $\theta_2$ defined by the first straight line 24 and the second straight line 25 is calculated, the stage 11 is rotated according to the included angle $\theta_2$ to perform a calibration of the rotational offset. Again, it is understood that, the rotation angle of the stage 11 is not necessarily equal to the included angle $\theta_2$ defined by the first straight line 24 and the second straight line 25; the reason is already described in the first embodiment and not repeated in this part.

In the second embodiment, the rotation angle of the stage 11 is determined according to the included angle $\theta_2$ defined by the first straight line 24 and the second straight line 25. As shown in FIG. 7, during the engineer performs the touch operation, the engineer may subsequently tap and select two points on the horizontal line of the cross auxiliary line 139 to define the first straight line 24. Next, as shown in FIG. 8, the engineer may find if a longer straight line exists in the image 191 to define the third touch point 233 and the fourth touch point 234. For example, the same portions of different die patterns are tapped and selected as the third touch point 233 and the fourth touch point 234, respectively, to define the second straight line 25. If the rotational offset still exists after a first calibration procedure is performed, the aforementioned steps are repeated to control the rotation of the stage 11, until the image 191 does not have an obviously conceivable rotational offset.

In the second embodiment, when the engineer performs the touch operation on the touch-control screen 13, the position of the touch-control screen 13 where the engineer touches displays a special mark, so the engineer can know the position of the touch-control screen 13 being touched. As shown in FIG. 7, when the engineer touches the touch-control screen 13 via the fingertip or the stylus pen to define the first touch point 231, a circle mark 231a is displayed at the position of the first touch point 231, and the circle mark 231a is still displayed on the touch-control screen 13 even when the fingertip or the stylus pen leaves the touch-control screen 13. When the engineer further touches the touch-control screen 13 to define the second touch point 232, a circle mark 232a is displayed at the position of the second touch point 232, and the first straight line 24 defined by the first touch point 231 and the second touch point 232 is also displayed on the touch-control screen 13. Moreover, as shown in FIG. 8, when the engineer touches the touch-control screen 13 via the fingertip or the stylus pen to define the third touch point 233 and the fourth touch point 234, circle marks 233a, 234a are respectively displayed at the positions of the third touch pint 233 and the fourth touch point 234, and the second straight line 25 defined by the third touch point 233 and the fourth touch point 234 is also displayed on the touch-control screen 13. When the first straight line 24 and the second straight line 25 are defined, the stage 11 is rotated according to the included angle $\theta_2$ defined by the first straight line 24 and the second straight line 25, and the value of the included angle $\theta_2$ can be displayed on the touch-control screen 13 as a reference for the engineer.

Please refer to FIGS. 10 to 13, respectively illustrate a flowchart and schematic views (1), (2), and (3) of an aligning method according to a third embodiment of the instant disclosure. In both the second embodiment and the third embodiment, the stage 11 is rotated according to the included angle defined by two straight lines which are defined by the engineer through operating the touch-control screen 13; while in the third embodiment, the two straight lines are defined according to two touch tracks which is defined by the engineer through moving the fingertip or the stylus pen on the touch-control screen 13. The aligning method of the third embodiment is described as following.

Figure 11:
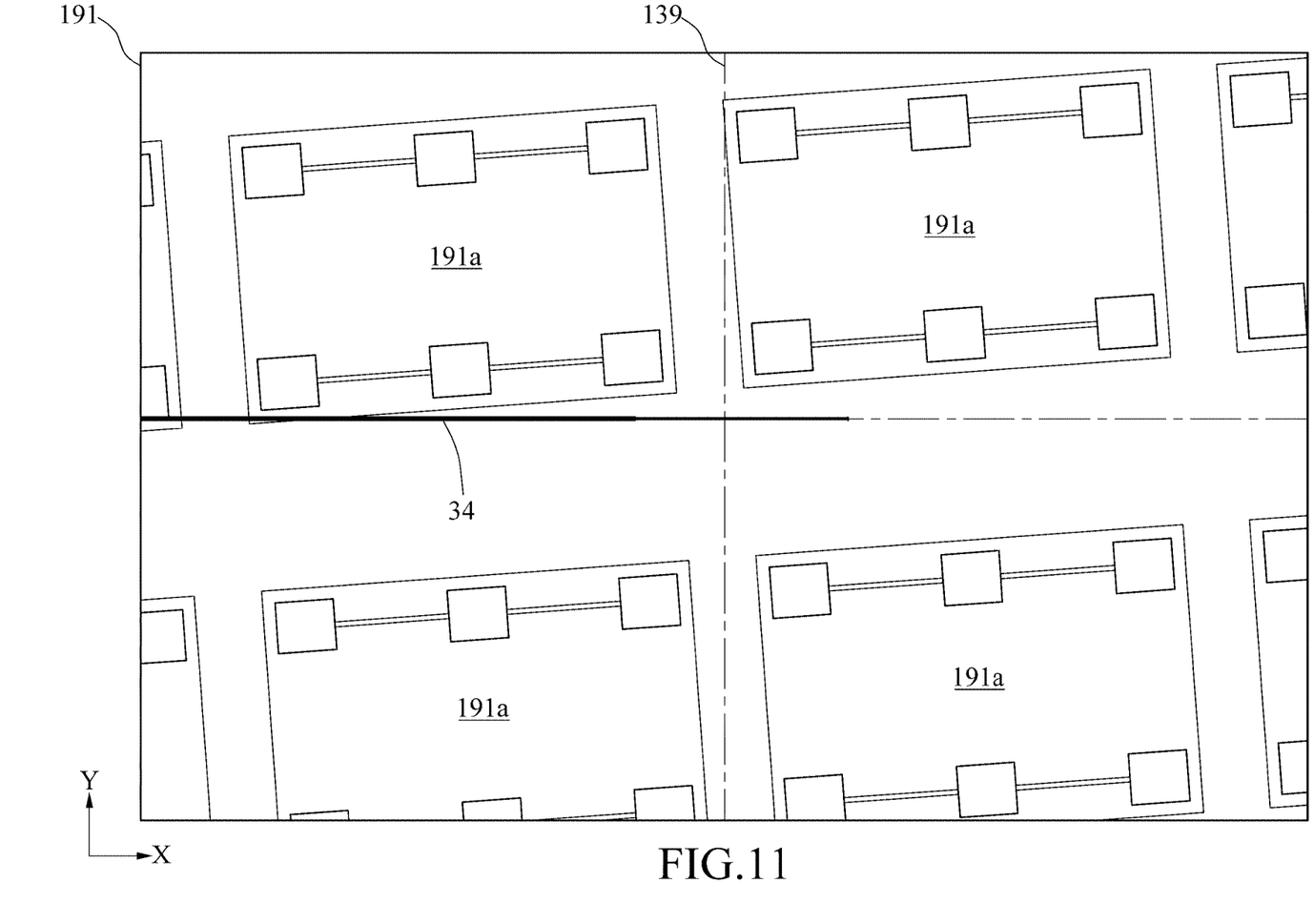
FIG. 11 illustrates a schematic view (1) of an aligning operation according to the third embodiment.
Figure 12:
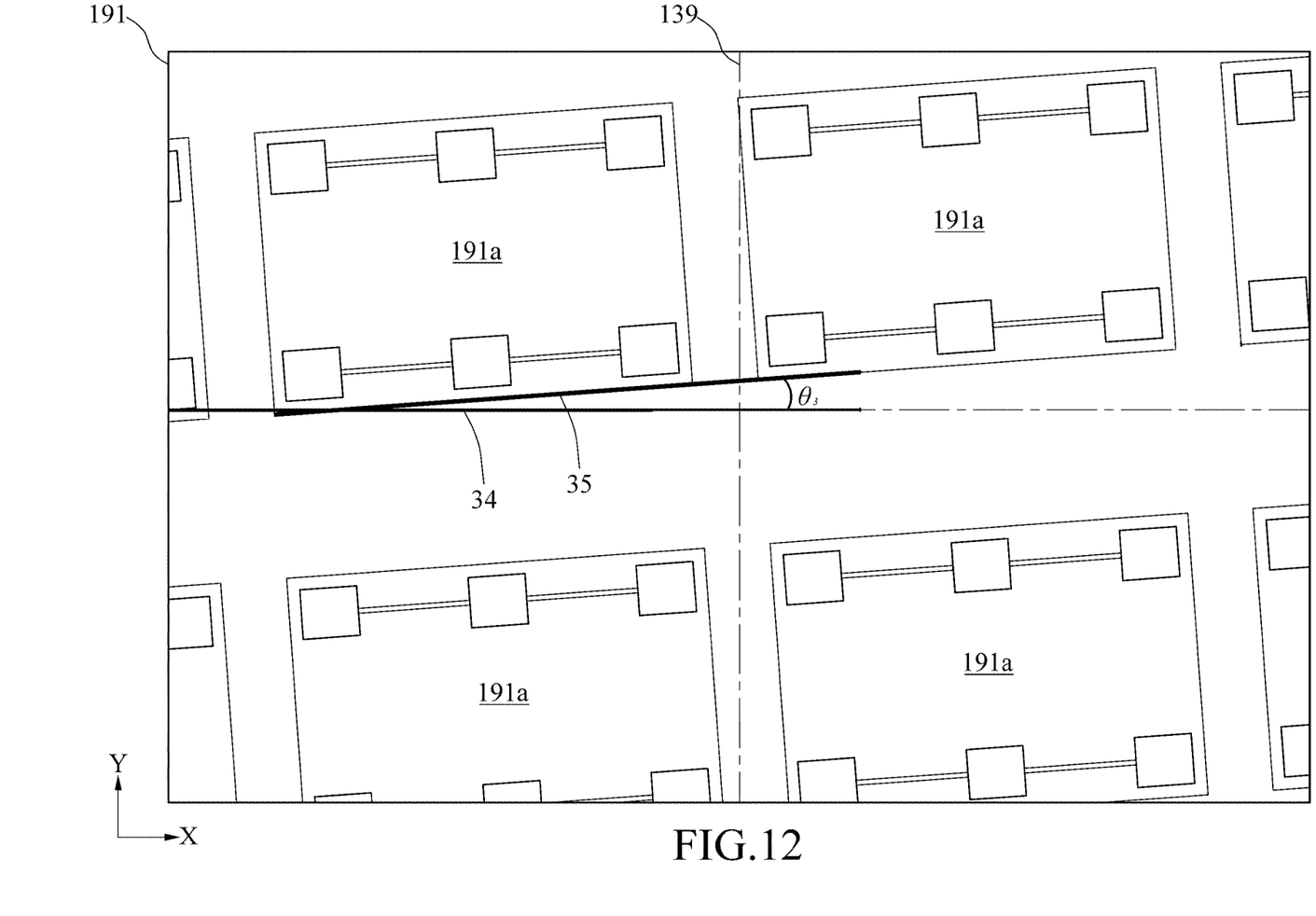
FIG. 12 illustrates a schematic view (2) of the aligning operation according to the third embodiment.
Figure 13:
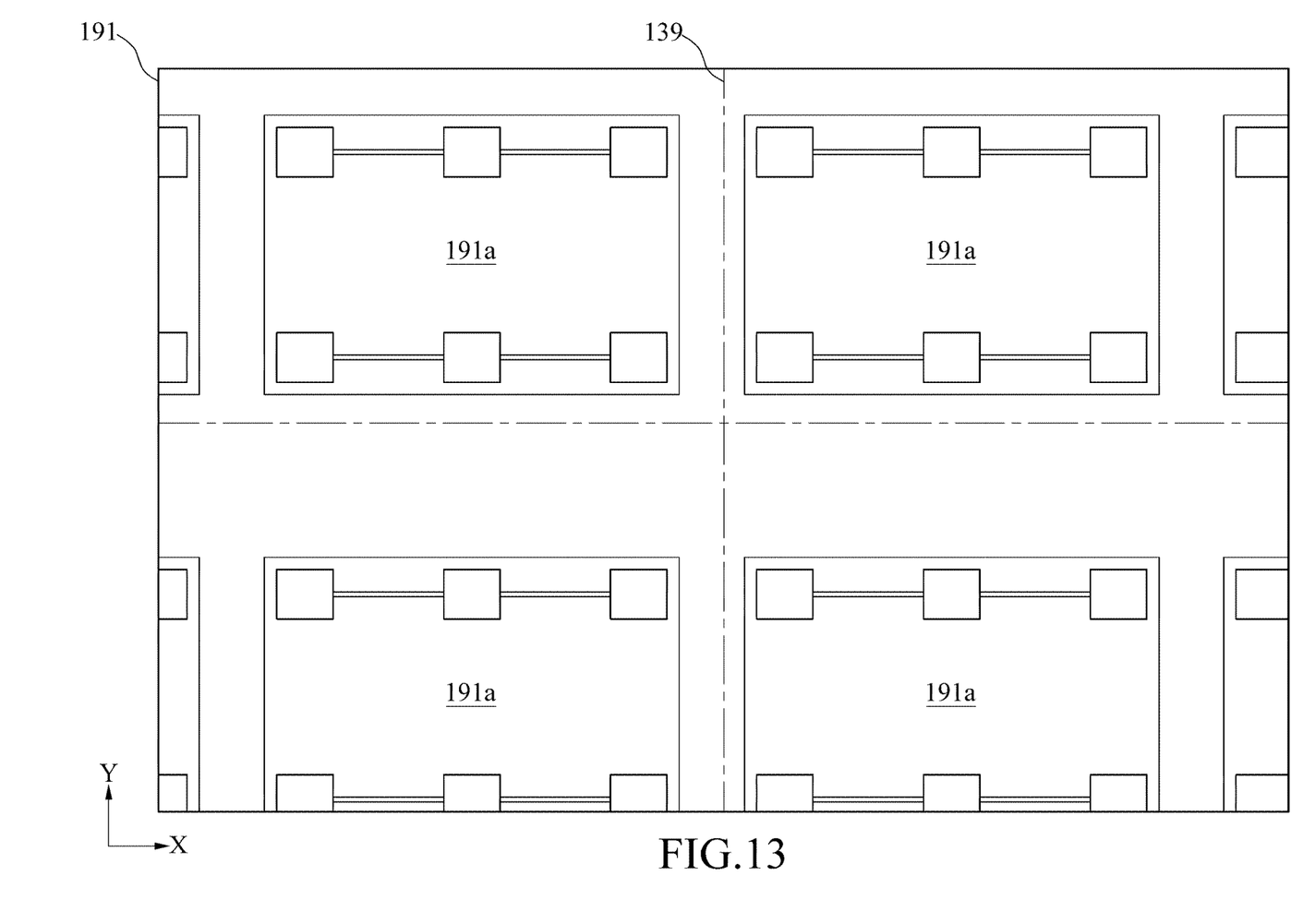
FIG. 13 illustrates a schematic view (3) of the aligning operation according to the third embodiment.

As shown in FIG. 1, the touch-control screen 13 displays the image 191 of the DUT 19 and the cross auxiliary line 139. Hence, with the auxiliary line 139, the engineer can roughly determine if the image 191 has an offset. By checking the die pattern 191a of the image 191 and the cross auxiliary line 139, the engineer can apparently see the image 191 of the DUT 19 has a rotational offset by an angle and needed to be calibrated. In this embodiment, the engineer moves the fingertip or the stylus pen on the touch-control screen 13 to form a first touch track, the move operation is detected, and a first straight line 34 is defined according to the first touch track. Next, as shown in FIG. 12, in this embodiment, the engineer moves the fingertip or the stylus pen on the touch-control screen 13 to form a second touch track, the second move operation is also detected, and a second straight line 35 is defined according to the second touch track. Then, as shown in FIG. 13, after an included angle $\theta_3$ defined by the first straight line 34 and the second straight line 35 is calculated, the stage 11 is rotated according to the included angle $\theta_3$ to perform a calibration of the rotational offset. Again, it is understood that, the rotation angle of the stage 11 is not necessarily equal to the included angle $\theta_3$ defined by the first straight line 34 and the second straight line 35; the reason is already described in the first embodiment and not repeated in this part.

In the third embodiment, the rotation angle of the stage 11 is determined according to the included angle $\theta_3$ defined by the first straight line 34 and the second straight line 35. As shown in FIG. 11, the engineer may move the fingertip or the stylus pen along the horizontal line of the cross auxiliary line 139 to define the first straight line 34. Next, as shown in FIG. 12, the engineer may find if a longer straight line exists in the image 191 to define the second straight line 35. For example, the engineer may move the fingertip or the stylus pen along the edges of two adjacent die patterns to define the second straight line 35. It is understood that, if the die pattern itself has a long-enough linear edge, the engineer may move the fingertip or the stylus pen along the edge of one die pattern to define the second straight line 35. If the rotational offset still exists after a first calibration procedure is performed, the aforementioned steps are repeated to control the rotation of the stage 11, until the image 191 does not have an obviously rotational offset.

In the third embodiment, after the first straight line 34 is defined, the first straight line 34 is continuously displayed on the touch-control screen 13 for a duration time, for example, five to twenty seconds. If no further touch track is detected during the duration time, the first straight line 34 will disappear. When the engineer moves the fingertip or the stylus pen on the touch-control screen 13 to form the touch track after the first straight line 34 disappears, such touch track is still taken as the first touch track. In other words, in this embodiment, with the premise of the first straight line 34 being in a display state, the subsequently detected another touch track is taken as the second touch track to define the second straight line 35 accordingly. Furthermore, after the second straight line 35 is defined, the second straight line 35 is continuously displayed on the touch-control screen 13 for a duration time, for example, five to twenty seconds. After the stage 11 is rotated, the first straight line 34 and the second straight line 35 disappear. Moreover, after the second straight line 35 is defined, the value of the included angle $\theta_3$ can be displayed on the touch-control screen 13. In this embodiment, the first straight line 34, the second straight line 35, and the value of the included angle $\theta_3$ may disappear at the same time after the stage 11 is rotated.

In one embodiment, the length of the first straight line 34 and/or the length of the second straight line 35 may be displayed on the touch-control screen 13 along with the first straight line 34 and/or the second straight line 35. Moreover, the included angle $\theta_3$ defined by the first straight line 34 and the second straight line 35 can be displayed on the touch-control screen 13 when the first straight line 34 and the second straight line 35 are displayed. Accordingly, the engineer can evaluate if the length of the defined first straight line 34 and the length of the defined second straight line 35 are long enough as compared with the whole DUT 19 in a convenient manner. Furthermore, since the included angle $\theta_3$ can be displayed on the touch-control screen 13, the engineer can evaluate the current offset condition of the DUT 19 and the rotation angle to be applied to the stage 11 in a convenient manner. The calculation of the real length of the first straight line 34 and/or the real length of the second straight line 35 can be achieved by: firstly the displayed length of the straight line on the touch-control screen 13 is calculated according to the pixels of the touch track formed by the movement operation, and then the real length of the straight line is calculated by multiplying the displayed length of the straight line on the touch-control screen 13 with the current magnifying power. For instance, if the displayed length of the first straight line 34 (or the second straight line 35) on the touch-control screen 13 is 100 mm, and the magnifying power for the image 191 is 100×, then, the real length of the first straight line 34 (or the second straight line 35) is 10 mm. Similarly, the calculation of the real angle of the included angle $\theta_3$ can be achieved. That is, the displayed angle of the included angle $\theta_3$ on the touch-control screen 13 is calculated according to the pixels of the included angle $\theta_3$ defined by the first straight line 34 and the second straight line 35. Moreover, the displayed angle can be further calibrated if necessary.

It is understood that, the touch tracks shown in FIGS. 11 and 12 (the first straight line 34 and the second straight line 35) are formed by moving the fingertip of the engineer or the stylus pen on the touch-control screen 13. Nevertheless, it is also understood that, the movement is not limited to a linear movement; the movement may be performed in other forms. For example, the movement may be a movement along an irregular pattern or a movement along a curve. The first straight line 34 and the second straight line 35 are formed by detecting respective start touch points and the end touch points. The end touch point is the end point of the first touch track (or the second touch track), namely, the position on the touch-control screen 13 where the fingertip or the stylus pen leaves the touch-control screen 13.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An aligning method for use in a semiconductor inspection apparatus, wherein the semiconductor inspection apparatus comprises a stage and a touch-control screen, wherein the aligning method comprises:
    defining a reference direction;
    displaying an image of a device under test (DUT) supported by the stage on the touch-control screen;
    detecting a first touch point and a second touch point occurred on the touch-control screen, and defining a straight line according to the first touch point and the second touch point;
    calculating an included angle defined by the straight line and the reference direction;
    rotating the stage according to the included angle; and
    displaying the straight line on the touch-control screen.

2. An aligning method for use in a semiconductor inspection apparatus, wherein the semiconductor inspection apparatus comprises a stage and a touch-control screen, wherein the aligning method comprises:
    defining a reference direction;
    displaying an image of a device under test (DUT) supported by the stage on the touch-control screen;
    detecting a first touch point and a second touch point occurred on the touch-control screen, and defining a straight line according to the first touch point and the second touch point;
    calculating an included angle defined by the straight line and the reference direction;
    rotating the stage according to the included angle; and
    displaying the first touch point and the second touch point on the touch-control screen.

3. An aligning method for use in a semiconductor inspection apparatus, wherein the semiconductor inspection apparatus comprises a stage and a touch-control screen, wherein the aligning method comprises:
  defining a reference direction;
  displaying an image of a device under test (DUT) supported by the stage on the touch-control screen;
  detecting a first touch point and a second touch point occurred on the touch-control screen, and defining a straight line according to the first touch point and the second touch point;
  detecting a variation of the first touch point and the second touch point;
  adjusting the straight line according to the variation of the first touch point and the second touch point
  calculating an included angle defined by the straight line and the reference direction; and
  rotating the stage according to the included angle.

4. An aligning method for use in a semiconductor inspection apparatus, wherein the semiconductor inspection apparatus comprises a stage and a touch-control screen, wherein the aligning method comprise:
  displaying an image of a device under test (DUT) supported by the stage on the touch-control screen;
  detecting a first touch point and a second touch point occurred on the touch-control screen, and defining a first straight line according to the first touch point and the second touch point;
  detecting a third touch point and a fourth touch point occurred on the touch-control screen, and defining a second straight line according to the third touch point and the fourth touch point;
  calculating an included angle defined by the first straight line and the second straight line; and
  rotating the stage according to the included angle.

5. The aligning method according to claim 4, further comprising: displaying the first straight line on the touch-control screen.

6. The aligning method according to claim 5, further comprising: displaying the second straight line on the touch-control screen.

7. The aligning method according to claim 4, further comprising: displaying the second straight line on the touch-control screen.

8. The aligning method according to claim 4, further comprising: displaying the first touch point, the second touch point, the third touch point, and the fourth touch point on the touch-control screen.

9. The aligning method according to claim 5, further comprising: displaying the first touch point, the second touch point, the third touch point, and the fourth touch point on the touch-control screen.

10. The aligning method according to claim 6, further comprising: displaying the first touch point, the second touch point, the third touch point, and the fourth touch point on the touch-control screen.

11. The aligning method according to claim 7, further comprising: displaying the first touch point, the second touch point, the third touch point, and the fourth touch point on the touch-control screen.

12. The aligning method according to claim 4, wherein after detecting the first touch point and the second touch point occurred on the touch-control screen, further comprising:
  detecting a variation of the first touch point and the second touch point; and
  adjusting the first straight line according to the variation of the first touch point and the second touch point.

13. The aligning method according to claim 4, wherein after detecting the third touch point and the fourth touch point occurred on the touch-control screen, further comprising:
  detecting a variation of the third touch point and the fourth touch point; and
  adjusting the second straight line according to the variation of the third touch point and the fourth touch point.

14. An aligning method for use in a semiconductor inspection apparatus, wherein the semiconductor inspection apparatus comprises a stage and a touch-control screen, wherein the aligning method comprises:
  displaying an image of a device under test (DUT) supported by the stage on the touch-control screen;
  detecting a first touch track occurred on the touch-control screen, and defining a first straight line according to the first touch track;
  detecting a second touch track occurred on the second-touch screen, and defining a second straight line according to the second touch track;
  calculating an included angle defined by the first straight line and the second straight line; and
  rotating the stage according to the included angle.

15. The aligning method according to claim 14, wherein after defining the first straight line according to the first touch track, the method further comprises: displaying the first straight line on the touch-control screen for a preset time, and detecting the second touch track occurred on the touch-control screen only when in the preset time.

16. The aligning method according to claim 15, wherein after defining the second straight line according to the second touch track, the method further comprises: displaying the second straight line on the touch-control screen.

* * * * *